UNITED STATES PATENT OFFICE.

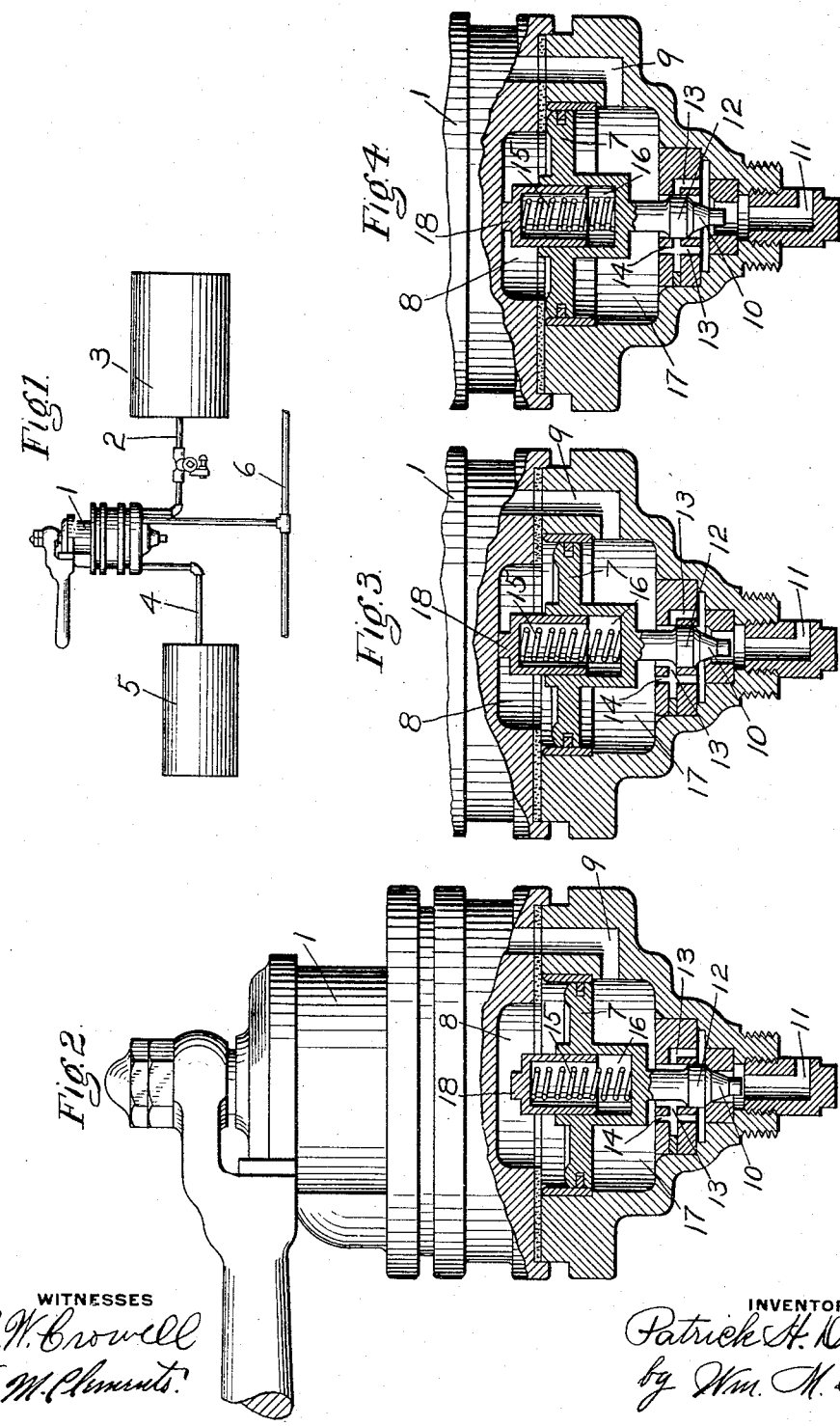

PATRICK H. DONOVAN, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

BRAKE-VALVE DEVICE.

1,177,606.   Specification of Letters Patent.   Patented Apr. 4, 1916.

Application filed November 25, 1914. Serial No. 873,873.

*To all whom it may concern:*

Be it known that I, PATRICK H. DONOVAN, a citizen of the United States, residing at Edgewood, in the county of Allegheny and State of Pennsylvania, have invented new and useful Improvements in Brake-Valve Devices, of which the following is a specification.

This invention relates to brake valve devices, and more particularly to the type employing an equalizing discharge valve mechanism for regulating the discharge of fluid from the brake pipe in effecting a service application of the brakes.

It is highly desirable to secure uniform action of the brakes in a train, especially on long heavy freight trains, since if the braking power developed at one point in the train be enough greater than that developed at some other point at a given instant, shocks and sometimes a break-in-two is liable to result. With the usual automatic fluid pressure brake, some time will necessarily elapse before a reduction in brake pipe pressure becomes effective at the rear end of the train, so that the brakes may be fully applied at the front end when the brakes at the rear end have only started to apply.

In view of the above, the principal object of my invention is to provide means for securing a more uniform application of the brakes throughout the train.

In carrying out my invention, a brake valve device is provided having an equalizing discharge valve mechanism adapted upon a reduction in equalizing reservoir pressure, in the usual manner, to first open the equalizing discharge valve so as to exhaust fluid from the train pipe at the ordinary rate corresponding with the rate of reduction in equalizing reservoir pressure, in order to start the reduction in brake pipe pressure, and then operating, if the train is long and the brake pipe volume large, to restrict the discharge of fluid from the brake pipe to the atmosphere and thus permit the more uniform development of braking power throughout the train.

In the accompanying drawing, Figure 1 is a diagrammatic view of a brake valve equipment embodying my invention; Fig. 2 an elevational view, partly in section, of a brake valve device, showing my improvement applied thereto, with the parts in normal position; Fig. 3 a sectional view, similar to Fig. 2, showing the equalizing discharge valve device in the initial position assumed when effecting a reduction in brake pipe pressure, and Fig. 4 a similar view with the parts in the positions assumed when the rate of reduction in equalizing reservoir pressure exceeds the rate of reduction in brake pipe pressure.

As shown in Fig. 1 of the drawing, the brake valve device 1 embodying my invention may be connected by pipe 2 to the main reservoir 3 and by pipe 4 to the equalizing reservoir 5, the brake pipe 6 being also connected to the brake valve device in the usual manner.

The brake valve device 1 contains an equalizing discharge valve piston 7, subject on one side to the pressure in chamber 8 which is open to the equalizing reservoir 5, and on the opposite side to the pressure in chamber 17, which is connected by passage 9 with brake pipe 6. The piston 7 operates a discharge valve 10 which controls the discharge of fluid from the brake pipe to an atmospheric exhaust port 11. According to my invention, the discharge valve 10 is provided with a piston valve section 12 adapted, when the discharge valve and piston are shifted to a certain position, to close ports 13, through which fluid is vented from the brake pipe. When the ports 13 are closed, fluid can flow from the brake pipe only through a restricted port 14 which opens into one of the ports 13. The movement of the discharge valve mechanism to close the ports 13 is opposed by a yielding resistance which may comprise a coil spring 15, mounted within a suitable chamber 16 in the discharge piston 7. The spring is held in position by means of a cap 18 which is slidably mounted in the chamber 16.

In operation, when the brake valve handle is moved to service application position, the preliminary exhaust port is opened and the pressure in chamber 8 and the equalizing reservoir 5 is reduced in the usual manner. The brake pipe pressure then lifts the piston 7 and unseats the discharge valve 10, so that fluid is vented from chamber 17 and the brake pipe through the annular space around the stem of the discharge valve and the ports 13 to the discharge port 11. In the opening movement of the piston 7, the cap 18 first engages the chamber wall of the brake valve and the resistance of the spring 15 then opposes further movement. If the train is short and the brake pipe volume such that the pressure therein can reduce as fast as the pressure in the equalizing reservoir is reducing through the preliminary discharge port, then the piston will remain in this position, as shown in Fig. 3 of the drawing, and the discharge valve operates to vent fluid from the brake pipe in the usual manner. If, however, the train is long, the pressure in the equalizing reservoir will reduce at a greater rate than the brake pipe pressure, and when a sufficient differential has been established, the tension of the spring 15 will be overcome and the piston 7 will be shifted by the higher brake pipe pressure to its uppermost position against the gasket. In this position, as shown in Fig. 4 of the drawing, the piston valve section 12 closes the ports 13, so that the only opening from the brake pipe to the atmosphere is by way of the restricted port 14. It will thus be seen that with the discharge valve in this position, the rate of reduction in brake pipe pressure will be much slower than at the beginning of the application. When the brake valve handle is turned to lap position, after making the desired reduction in equalizing reservoir pressure, fluid from the brake pipe will continue to exhaust to the atmosphere through the restricted port 14, until the brake pipe pressure has reduced to a point at which the equalizing pressure combined with the pressure of the spring 15 slightly exceeds the brake pipe pressure, when the piston 7 will be moved downwardly, again opening the ports 13, so that the final exhaust of fluid from the brake pipe will be at the initial or usual rate. By this means, when an application of the brakes is made, the brake pipe pressure is at first reduced at the usual normal rate so as to start the application of the brakes and then the rate of reduction is automatically slowed up, if the train is long, so as to provide a more nearly uniform rate of brake pipe reduction throughout the train from which it follows that the difference in braking pressure between the head and rear developed at a given instant will be less than heretofore.

Having now described my invention, what I claim as new and desire to secure by Letters Patent, is:

1. In a fluid pressure brake, the combination with a brake pipe, of a brake valve device having an equalizing discharge valve mechanism for controlling the discharge of fluid from the brake pipe and means for limiting the rate of reduction in brake pipe pressure upon the rate of reduction in equalizing reservoir pressure exceeding the rate of reduction in brake pipe pressure.

2. In a fluid pressure brake, the combination with a brake pipe, of a brake valve device having an equalizing discharge valve mechanism for controlling the discharge of fluid from the brake pipe to effect an application of the brakes and means operated when the rate of reduction in equalizing reservoir pressure exceeds the rate of reduction in brake pipe pressure for restricting the discharge of fluid from the brake pipe.

3. In a fluid pressure brake, the combination with a brake pipe, of a brake valve device having an equalizing discharge valve mechanism subject to the opposing pressures of the brake pipe and equalizing reservoir for controlling the discharge of fluid from the brake pipe and means associated with the discharge valve mechanism for restricting the discharge from the brake pipe when the rate of reduction in equalizing reservoir pressure exceeds the rate of reduction in brake pipe pressure.

4. An equalizing discharge valve mechanism comprising a piston subject to the opposing pressures of the brake pipe and equalizing reservoir, a valve operated by said piston for venting fluid from the brake pipe, and means associated with said valve for restricting the flow of fluid from the brake pipe when the brake pipe pressure is reducing at a slower rate than the equalizing reservoir pressure.

5. An equalizing discharge valve mechanism comprising a piston subject to the opposing pressures of the brake pipe and equalizing reservoir, a valve operated by said piston for venting fluid from the brake pipe, means associated with said valve for restricting the flow of fluid from the brake pipe when the rate of reduction in equalizing reservoir pressure exceeds the rate of reduction in brake pipe pressure, and a yielding stop device for resisting movement of the piston and valve tending to restrict the flow from the brake pipe.

6. An equalizing discharge valve mechanism comprising a piston subject to the opposing pressures of the brake pipe and equalizing reservoir, a valve operated by said piston for venting fluid from the brake pipe, means associated with said valve for restricting the flow of fluid from the brake pipe when the rate of reduction in equalizing reservoir pressure exceeds the rate of reduction in brake pipe pressure, and a yielding stop mounted in said piston for resisting movement of the parts from the position in which flow from the brake pipe is normal to the position in which the flow is restricted.

7. In a fluid pressure brake, the combination with a brake pipe, of a brake valve device and an equalizing discharge valve mechanism operated upon a reduction in equalizing reservoir pressure for discharging fluid from the brake pipe at the usual rate and means operating when the rate of reduction in brake pipe pressure is less than the rate of reduction in equalizing reservoir pressure to restrict the discharge of fluid from the brake pipe.

8. An equalizing discharge valve mechanism comprising a piston, a valve movable by said piston for opening ports through which fluid is discharged from the brake pipe and means associated with said valve for closing said ports upon a further movement of said valve.

In testimony whereof I have hereunto set my hand.

PATRICK H. DONOVAN.

Witnesses:
A. M. CLEMENTS,
S. W. KEEFER.